US008537555B2

(12) United States Patent
Huang et al.

(10) Patent No.: US 8,537,555 B2
(45) Date of Patent: Sep. 17, 2013

(54) HEAT-DISSIPATING CASING FOR COMMUNICATION APPARATUS

(75) Inventors: Hong-Chun Huang, Toufen Township (TW); Ta-Fei Chen, Hsinchu (TW); Ching-Feng Hsieh, Taipei (TW)

(73) Assignee: Askey Computer Corp. (TW)

( * ) Notice: Subject to any disclaimer, the term of this patent is extended or adjusted under 35 U.S.C. 154(b) by 224 days.

(21) Appl. No.: 13/176,864

(22) Filed: Jul. 6, 2011

(65) Prior Publication Data

US 2012/0287578 A1 Nov. 15, 2012

(30) Foreign Application Priority Data

May 13, 2011 (TW) .............................. 100208616 U

(51) Int. Cl.
*H05K 7/20* (2006.01)

(52) U.S. Cl.
USPC ...... 361/714; 361/679.54; 361/690; 361/704; 165/80.2; 165/104.33; 165/185; 312/223.1; 174/50.5; 174/520

(58) Field of Classification Search
USPC .................. 361/679.46, 679.52, 679.54, 690, 361/701–711, 714, 715–724; 165/80.3, 80.2, 165/104.33, 185; 174/50, 50.5, 50.51, 520, 174/526, 16.3; 312/223.1, 223.2, 229, 236
See application file for complete search history.

(56) References Cited

U.S. PATENT DOCUMENTS

| 5,424,913 | A  | * | 6/1995  | Swindler ................. 361/679.54 |
| 5,969,943 | A  | * | 10/1999 | Oyamada ...................... 361/695 |
| 7,161,804 | B2 | * | 1/2007  | Oyamada ...................... 361/703 |
| 7,251,133 | B2 | * | 7/2007  | Wallace ........................ 361/690 |
| 7,436,660 | B2 | * | 10/2008 | Pedoeem et al. .............. 361/690 |
| 7,532,474 | B2 | * | 5/2009  | Xue et al. ...................... 361/704 |
| 7,782,618 | B2 | * | 8/2010  | Hata et al. ..................... 361/704 |
| 7,944,697 | B2 | * | 5/2011  | Hata et al. ..................... 361/704 |
| 2004/0165352 | A1 | * | 8/2004 | Oyamada ...................... 361/703 |
| 2009/0059534 | A1 | * | 3/2009 | Hata et al. ..................... 361/709 |

* cited by examiner

*Primary Examiner* — Michail V Datskovskiy
(74) *Attorney, Agent, or Firm* — Schmeiser, Olsen & Watts LLP

(57) ABSTRACT

A heat-dissipating casing for a communication apparatus accommodates a circuit board having a power element and includes an insulating case, a lid coupled to the insulating case, and a thermally conductive metal member. The insulating case has a receiving space, a first opening, and a second opening. The first and second openings communicate with the receiving space. The thermally conductive metal member is fixed to the inside of the insulating case, seals the second opening, and dissipates heat generated by the power element. The heat-dissipating casing is effective in dissipating heat, characterized by its low weight and low production costs, and conducive to protection and dust prevention.

16 Claims, 5 Drawing Sheets

HEAT-DISSIPATING CASING FOR COMMUNICATION APPARATUS

CROSS-REFERENCE TO RELATED APPLICATION

This non-provisional application claims priority under 35 U.S.C. §119(a) on Patent Application No(s). 100208616 filed in Taiwan, R.O.C. on May 13, 2011, the entire contents of which are hereby incorporated by reference.

FIELD OF TECHNOLOGY

The present invention relates to heat-dissipating casings for communication apparatuses, and more particularly, to a heat-dissipating casing adapted for use in a communication apparatus to dissipate heat therefrom efficiently and reduce the weight of the casing greatly.

BACKGROUND

The application of various communication apparatuses is becoming more diversified and is increasingly sophisticated in terms of performance due to technological advance, thereby resulting in an increase in the requirements for the precision of related parts and components of the communication apparatuses and their operating environments.

Hence, a communication apparatus is typically equipped with a casing for accommodating a circuit board, parts and components, and various signal transmission devices. A good casing of a communication apparatus not only fends off the intrusion of dust or moisture, but also dissipates heat efficiently, such that heat generated by the communication apparatus in operation can be transferred to the outside quickly to ensure that the communication apparatus can operate efficiently and persistently.

Referring to FIG. 1, there is shown a schematic perspective view of a conventional casing for a communication apparatus. As shown in the drawing, the casing 1 comprises a metal case 10 and a lid 12 hinged to the metal case 10. Shutting the metal case 10 and the lid 12 results in a hermetically sealed receiving space for protecting the circuit board received therein as well as various related signal transmission devices mounted on the circuit board and other parts and components. In this regard, any element that is mounted on the circuit board and is capable of generating heat when operating is defined as a power element. Examples of the power element include electronic components, a collection of a plurality of electronic components, electronic chips, and electronic devices. One side of the power element can directly come into contact with an inner surface of the metal case 10, or alternatively an additional thermally conductive element can be disposed between the power element and the inner surface of the metal case 10, such that any heat generated by the power element or the circuit board in operation can be removed therefrom by means of the metal case 10, transferred to the metal case 10, and dissipated to the external environment. In addition, the metal case 10 further comprises a plurality of cooling fins 14 which is integrally formed at the outward-facing bottom of the metal case 10 for increasing the heat-dissipating area of the metal case 10 and thereby enhancing the efficiency of heat dissipation.

Regarding the conventional casing 1 for a communication apparatus, the metal case 10 is integrally formed from a metallic material of high thermal conductivity in a die casting process in a manner that the metal case 10 thus formed has an exposed heat-dissipating surface. However, the metal case 10 adds to the weight of the casing 1, thereby not only causing inconvenience to workers during an installation process but also increasing production costs.

SUMMARY

In view of the drawbacks of the conventional casing for a communication apparatus, it is an objective of the present invention to provide a heat-dissipating casing for a communication apparatus to enable weight reduction and cost cutting.

In order to achieve the above and other objectives, the present invention provides a heat-dissipating casing for a communication apparatus. The heat-dissipating casing at least accommodates a circuit board. The circuit board has at least a surface having a power element thereon. The heat-dissipating casing comprises: an insulating case having therein a receiving space for receiving the circuit board and having a first opening and a second opening being both in communication with the receiving space; a lid coupled to the insulating case for sealing hermetically the first opening; and a thermally conductive metal member fixed to the inside of the insulating case for sealing hermetically the second opening to transfer and dissipate heat from the power element outward.

Regarding the heat-dissipating casing, a platform is disposed on the thermally conductive metal member and exposed from the second opening. A flange is disposed at an edge of the second opening, and an engaging portion is disposed at an edge of the platform, thereby allowing the engaging portion to abut against the flange.

Regarding the heat-dissipating casing, a plurality of cooling fins, a heat pipe, or a combination thereof is disposed at an outward-facing surface of the thermally conductive metal member or at a surface of the platform for enhancing heat dissipation performance.

Regarding the heat-dissipating casing, a first coupling member is disposed in the receiving space, and a second coupling member is disposed at the thermally conductive metal member for being coupled to the first coupling member, wherein the first coupling member and the second coupling member are a screw hole-equipped post and a through hole corresponding in position to the post, respectively, such that the thermally conductive metal member is fixed to the inside of the insulating case by means of a screw passing through the screw hole and the through hole.

Regarding the heat-dissipating casing, an installing portion is disposed at an inward-facing surface of the thermally conductive metal member for fixing the circuit board in place. In addition, an elevation portion is disposed at an inward-facing surface of the thermally conductive metal member for coming into contact with the circuit board or the power element.

Regarding the heat-dissipating casing, a plurality of legs is disposed at an outward-facing bottom of the insulating case.

Accordingly, the present invention provides a heat-dissipating casing for use with a communication apparatus. The heat-dissipating casing accommodates a circuit board, parts and components, and various signal transmission devices mounted on the circuit board and is effective in fending off the intrusion of dust or moisture and dissipating internally-generated heat to the outside by coupling the thermally conductive metal member and the insulating case together such that the communication apparatus can operate efficiently and persistently. Compared with a conventional casing for a communication apparatus, the heat-dissipating casing in the specific embodiments of the present invention advantageously features a greatly reduced weight, ease of installation, prevention of a waste of metallic materials, and reduction in production costs.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION

Figure 1:
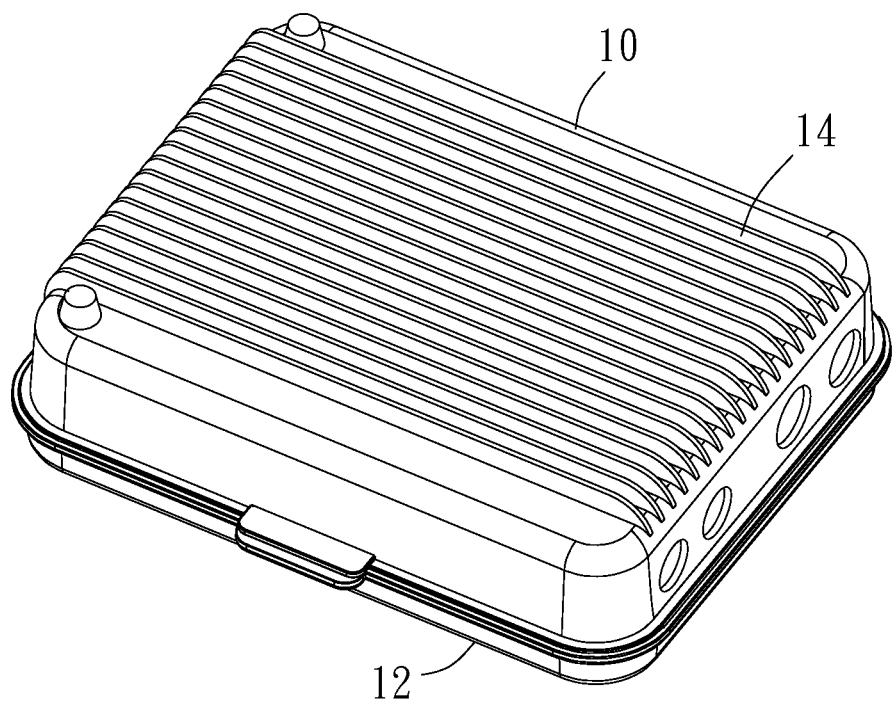
FIG. 1 is a schematic perspective view of a conventional casing for a communication apparatus.
Figure 2:
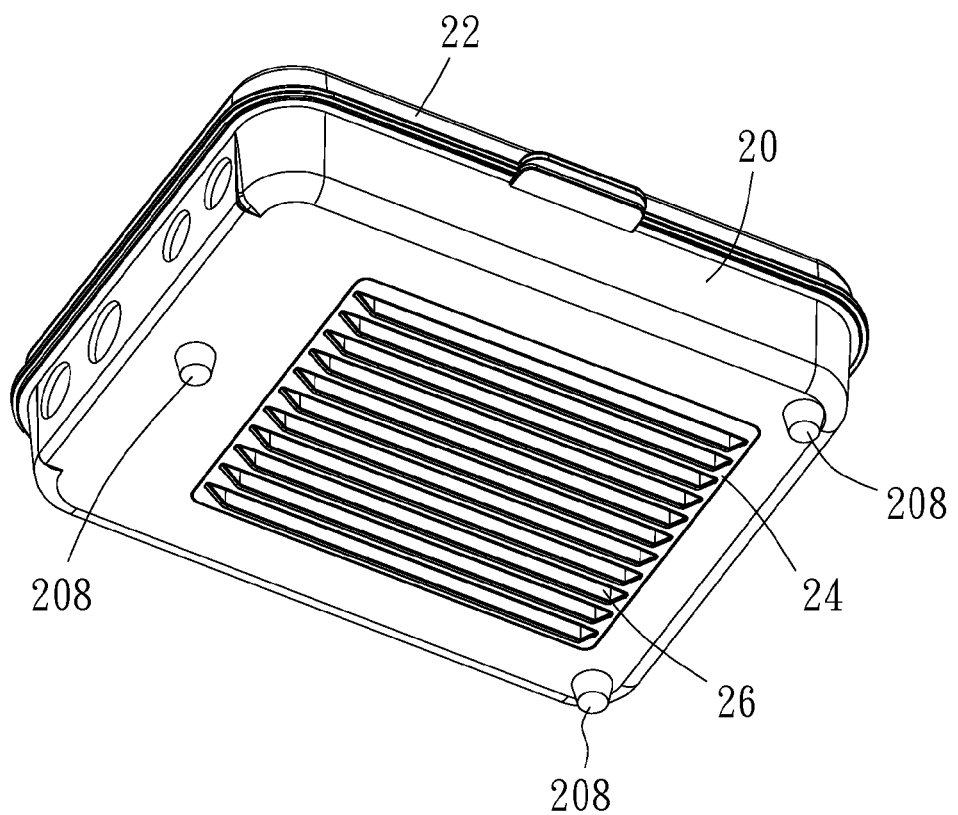
FIG. 2 is a schematic assembled view of a heat-dissipating casing for a communication apparatus according to a specific embodiment of the present invention.
Figure 3:
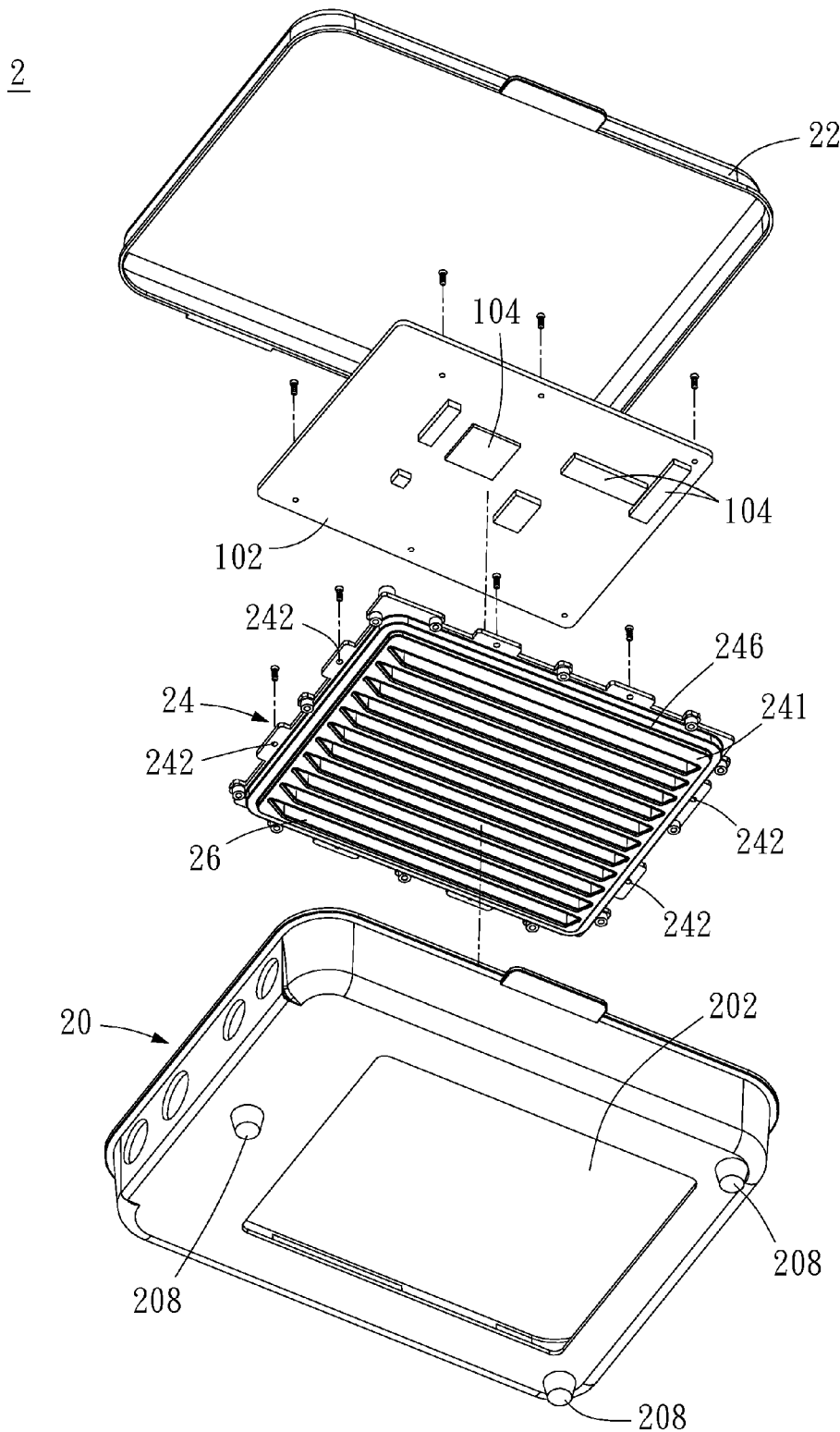
FIG. 3 is a schematic exploded view of the heat-dissipating casing for a communication apparatus according to a specific embodiment of the present invention.
Figure 4:
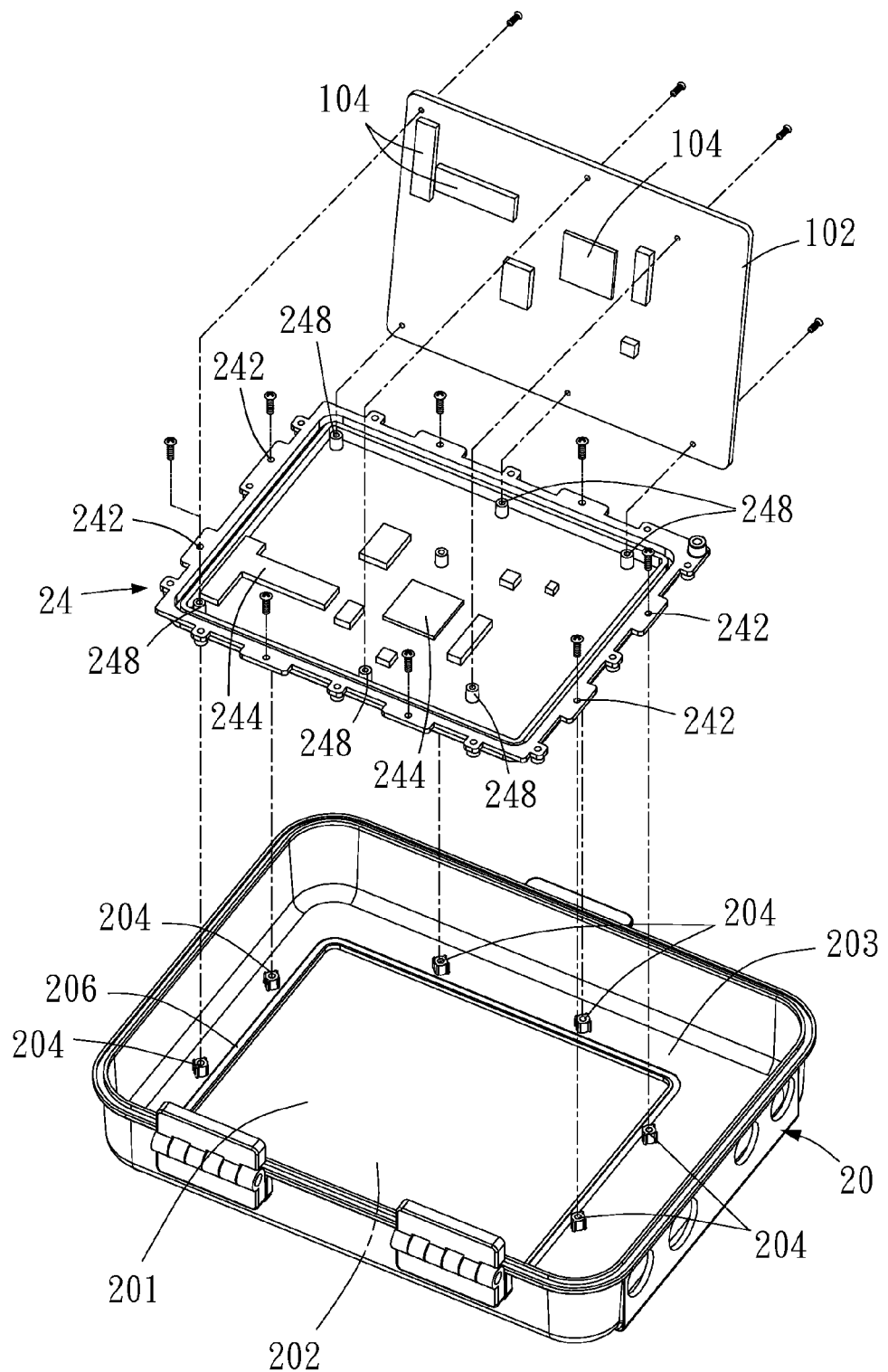
FIG. 4 is a schematic internal view of an insulating case, a thermally conductive metal member and a circuit board of the heat-dissipating casing for a communication apparatus according to a specific embodiment of the present invention.

Referring to FIG. 2 through FIG. 4, there are shown a schematic assembled view, a schematic exploded view, and a schematic internal view of a heat-dissipating casing for a communication apparatus according to a specific embodiment of the present invention. As shown in the drawings, a heat-dissipating casing 2 of the present invention is for accommodating a circuit board 102, and a power element 104 is disposed on at least a side of the circuit board 102. The heat-dissipating casing 2 comprises an insulating case 20, a lid 22, and a thermally conductive metal member 24. The insulating case 20 comprises a receiving space 203 for receiving the circuit board 102. The insulating case 20 further comprises a first opening 201 and a second opening 202 which are in communication with the receiving space 203. The lid 22 is coupled to the insulating case 20 for sealing hermetically the first opening 201. The thermally conductive metal member 24 is fixed to the inside of the insulating case 20 to seal the second opening 202 hermetically, and thus is for transferring and dissipating the heat generated by the power element 104 to the outside.

Furthermore, in this specific embodiment, the insulating case 20, which is a case-like structure, is made of a plastic, an acrylic, or any other insulating material, and is formed, by injection molding, the receiving space 203, as well as the first opening 201 and the second opening 202 which are in communication with the receiving space 203. Hence, the insulating case 20 reduces the weight of the heat-dissipating casing 2 much more than a case fully made of metal does.

Furthermore, in this specific embodiment, the lid 22 can be coupled to the insulating case 20 by any means which is not restricted to the hinging means disclosed in this specific embodiment and shown in the drawings. The lid 22 and the insulating case 20 can be coupled together by means of the rotational connection around an axis, an engagement structure, or an penetration and locking mechanism enabled by a screw, such that the lid 22 can cover the insulating case 20 for sealing hermetically the first opening 20.

Furthermore, in this specific embodiment, the thermally conductive metal member 24 is fixed to the inside of the insulating case 20 by whatever means so as to seal the second opening 202 hermetically. As exemplified by the drawings, the thermally conductive metal member 24 can be longer and wider than the second opening 202 and is substantially panel-shaped. The edge of the thermally conductive metal member 24 can be locked to the insulating case 20, such that the thermally conductive metal member 24 is fixed to the inside of the insulating case 20 for sealing hermetically the second opening 202. Also, a covering plate (not shown) having a plurality of heat-dissipating holes or heat-dissipating windows and corresponding in position to the second opening 202 can be further disposed on the insulating case 20, and the thermally conductive metal member 24 can transfer and dissipate heat to the outside through the heat-dissipating holes or heat-dissipating windows.

When the communication apparatus is operating, the heat generated by the power element 104 inside the heat-dissipating casing 2 of the present invention can be removed by the thermally conductive metal member 24 and dissipated to the ambient air through the surface of the thermally conductive metal member 24, such that the heat does not accumulate inside the heat-dissipating casing 2, thereby ensuring that the communication apparatus can operate efficiently and persistently.

Figure 5:
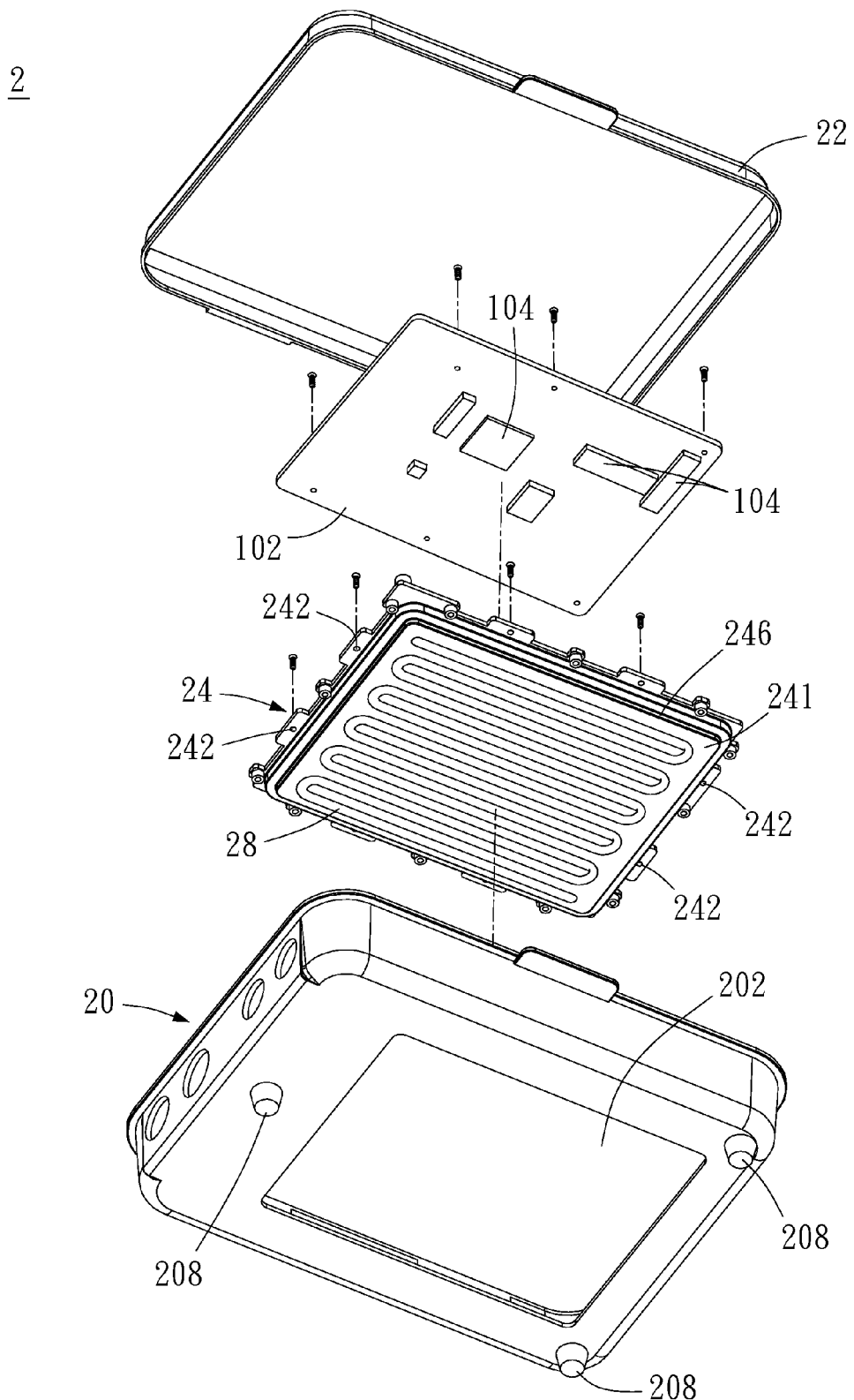
FIG. 5 is a schematic view of a heat pipe-equipped thermally conductive metal member of the heat-dissipating casing according to a specific embodiment of the present invention.

Regarding the heat-dissipating casing 2, a plurality of cooling fins, a heat pipe, or a combination thereof can further be disposed on the outward-facing surface of the thermally conductive metal member 24 to increase its heat-dissipating surface area and enhance its heat-dissipating performance. As shown in FIG. 2 and FIG. 3, a plurality of spaced-apart cooling fins 26 is disposed on an outward-facing surface of the thermally conductive metal member 24. The cooling fins 26 are formed on the surface of the thermally conductive metal member 24 and confined to the second opening 202. The cooling fins 26 are spaced apart from each other and arranged in various patterns. For example, as shown in FIG. 2 and FIG. 3, the cooling fins 26, which are straight and parallel, are spaced apart from each other and integrally formed with the thermally conductive metal member 24 as a unitary structure. Furthermore, referring to FIG. 5, a heat pipe 28 is disposed on the outward-facing surface of the thermally conductive metal member 24. The heat pipe 28 is confined to the second opening 202 when disposed on the outward-facing surface of the thermally conductive metal member 24, such that the heat transferred from the inside of the heat-dissipating casing 2 to the thermally conductive metal member 24 can be quickly dissipated to the external environment. Alternatively, in a variant embodiment (not shown) of the present invention, a combination the cooling fins 26 and the heat pipe 28 is disposed on the outward-facing surface of the thermally conductive metal member 24.

Referring to FIG. 2 through FIG. 4, a platform 241 is disposed on the thermally conductive metal member 24 of the heat-dissipating casing 2 and exposed from the second opening 202. The platform 241 corresponds in shape to the second opening 202, because the platform 421 matches the second opening 202 in length, width, and height. As a result, once the thermally conductive metal member 24 seals the second opening 202 hermetically, the thermally conductive metal member 24 will be flush with the outward-facing bottom of the insulating case 20. In addition, a flange 206 (shown in FIG. 4) is disposed at the edge of the second opening 202 of the insulating case 20 of the heat-dissipating casing 2, and an engaging portion 246 (shown in FIG. 3) is disposed at the edge of the platform 241 of the thermally conductive metal member 24. The flange 206 and the engaging portion 246 match in shape and engage with each other; hence, once the thermally conductive metal member 24 seals the second opening 202 (shown in FIG. 2) hermetically, the engaging portion 246 will abut against the flange 206 and enable the platform 241 to be engaged with the second opening 202, thereby enhancing the hermetic sealing of the junction between the insulating case 20 and the thermally conductive metal member 24. Moreover, the cooling fins, the heat pipe, or a combination thereof can also be disposed on the platform 241 in order to enhance heat dissipation performance.

Referring to FIG. 4, there is shown a schematic internal view of an insulating case of the heat-dissipating casing according to a specific embodiment of the present invention. As shown in FIG. 4, a first coupling member 204 is disposed in the receiving space 203 of the insulating case 20 of the heat-dissipating casing 2, a second coupling member 242 corresponding in position to the first coupling member 204 is disposed at the thermally conductive metal member 24, such that the thermally conductive metal member 24 can be fixed to the inside of the insulating case 20 by coupling the second coupling member 242 and the first coupling member 204 together. As shown in the drawings, the first coupling member 204 is a screw hole-equipped post which is disposed in the receiving space 203 and positioned proximate to the second opening 202, and the second coupling member 242 is a through hole which corresponds in position and quantity to the post and is disposed at the edge of the thermally conductive metal member 24. Hence, the thermally conductive metal member 24 can be fixed to the inside of the insulating case 20 by means of a screw that passes through the screw hole and the through hole. Furthermore, the first coupling member 204 and the second coupling member 242 are not restrictive to the disclosure in the aforesaid embodiment; instead, the first coupling member 204 and the second coupling member 242 may come in any other fixing mechanism, such as an engaging structure, a fastening structure, a locking structure, or an embedding structure.

As shown in FIG. 4, an installing portion 248 is disposed at the inward-facing surface of the thermally conductive metal member 24 for fixing the circuit board 102 to the receiving space 203. As shown in FIG. 4, the installing portion 248 is a screw hole-equipped post, and a through hole corresponding in position and quantity to the installing portion 248 is disposed on the circuit board 102, such that the circuit board 102 can be fixed in place by means of a screw that passes through the screw hole and the through hole. Furthermore, the installing portion 248 is not restrictive to the disclosure in the aforesaid embodiment; instead, the installing portion 248 may come in any other fixing mechanism that operates in conjunction with the circuit board 102, such as an engaging structure, a fastening structure, a locking structure, or an embedding structure.

As shown in FIG. 4, an elevation portion 244 is disposed at the inward-facing surface of the thermally conductive metal member 24, and the elevation portion 244 corresponds in position, shape, or area to the circuit board 102 or the power element 104 on the circuit board 102 for coming into contact with a heat-accumulating position of the circuit board 102 or a heat-generating side of the power element 104, and thus the increased thermal conductivity of the heat-dissipating casing 2 allows the heat generated by the power element 104 in operation to be removed quickly before being transferred and dissipated to the outside.

Referring to FIG. 2 and FIG. 3, in this specific embodiment, a plurality of legs 208 is disposed on the outward-facing bottom of the insulating case 20 of the heat-dissipating casing 2 for underpinning the heat-dissipating casing 2 and maintaining a gap thereunder to circulate air within the gap and thereby dissipate heat from the thermally conductive metal member 24, and/or the cooling fins 26 thereon, or the heat pipe 28 thereon by convection of air. Also, the quantity and positions of the legs 208 are subject to variation as needed and thus are not limited by the drawings.

Accordingly, the present invention provides a heat-dissipating casing for use with a communication apparatus. The heat-dissipating casing accommodates a circuit board, parts and components, and various signal transmission devices mounted on the circuit board and is effective in fending off the intrusion of dust or moisture and dissipating internally-generated heat to the outside by coupling the thermally conductive metal member and the insulating case together such that the communication apparatus can operate efficiently and persistently. Compared with a conventional casing for a communication apparatus, the heat-dissipating casing in the specific embodiments of the present invention advantageously features a greatly reduced weight, ease of installation, prevention of a waste of metallic materials, and reduction in production costs.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A heat-dissipating casing for a communication apparatus, the heat-dissipating casing being at least for accommodating a circuit board, the circuit board having at least a surface having a power element thereon, the heat-dissipating casing comprising:
    an insulating case having therein a receiving space for receiving the circuit board and having a first opening and a second opening being both in communication with the receiving space;
    a lid coupled to the insulating case for sealing hermetically the first opening; and
    a thermally conductive metal member fixed to an inside of the insulating case for sealing hermetically the second opening to transfer and dissipate heat from the power element outward, wherein an elevation portion is disposed at an inward-facing surface of the thermally conductive metal member for coming into contact with at least one of the circuit board and the power element.

2. The heat-dissipating casing of claim 1, wherein a first coupling member is disposed in the receiving space, and a second coupling member is disposed at the thermally conductive metal member for being coupled to the first coupling member.

3. The heat-dissipating casing of claim 2, wherein the first coupling member and the second coupling member are a screw hole-equipped post and a through hole corresponding in position to the post, respectively, such that the thermally conductive metal member is fixed to the inside of the insulating case by means of a screw passing through the screw hole and the through hole.

4. The heat-dissipating casing of claim 1, wherein an installing portion is disposed at an inward-facing surface of the thermally conductive metal member for fixing the circuit board in place.

5. The heat-dissipating casing of claim 1, wherein at least one of a plurality of cooling fins and a heat pipe is disposed on an outward-facing surface of the thermally conductive metal member.

6. The heat-dissipating casing of claim 5, wherein a first coupling member is disposed in the receiving space, and a second coupling member is disposed at the thermally conductive metal member for being coupled to the first coupling member.

7. The heat-dissipating casing of claim 5, wherein an installing portion is disposed at an inward-facing surface of the thermally conductive metal member for fixing the circuit board in place.

8. The heat-dissipating casing of claim 5, wherein a plurality of legs is disposed at an outward-facing bottom of the insulating case.

9. The heat-dissipating casing of claim 1, wherein a plurality of legs is disposed at an outward-facing bottom of the insulating case.

10. The heat-dissipating casing of claim 1, wherein a platform is disposed on the thermally conductive metal member and exposed from the second opening.

11. The heat-dissipating casing of claim 10, wherein an installing portion is disposed at an inward-facing surface of the thermally conductive metal member for fixing the circuit board in place.

12. The heat-dissipating casing of claim 10, wherein a flange is disposed at an edge of the second opening, and an engaging portion is disposed at an edge of the platform, thereby allowing the engaging portion to abut against the flange.

13. The heat-dissipating casing of claim 12, wherein a first coupling member is disposed in the receiving space, and a second coupling member is disposed at the thermally conductive metal member for being coupled to the first coupling member.

14. The heat-dissipating casing of claim 12, wherein an installing portion is disposed at an inward-facing surface of the thermally conductive metal member for fixing the circuit board in place.

15. The heat-dissipating casing of claim 10, wherein at least one of a plurality of cooling fins and a heat pipe is disposed on a surface of the platform.

16. The heat-dissipating casing of claim 10, wherein a first coupling member is disposed in the receiving space, and a second coupling member is disposed at the thermally conductive metal member for being coupled to the first coupling member.

* * * * *